May 26, 1970 — J. TONEY — 3,514,178
KALEIDOSCOPE
Filed July 10, 1967 — 2 Sheets-Sheet 1
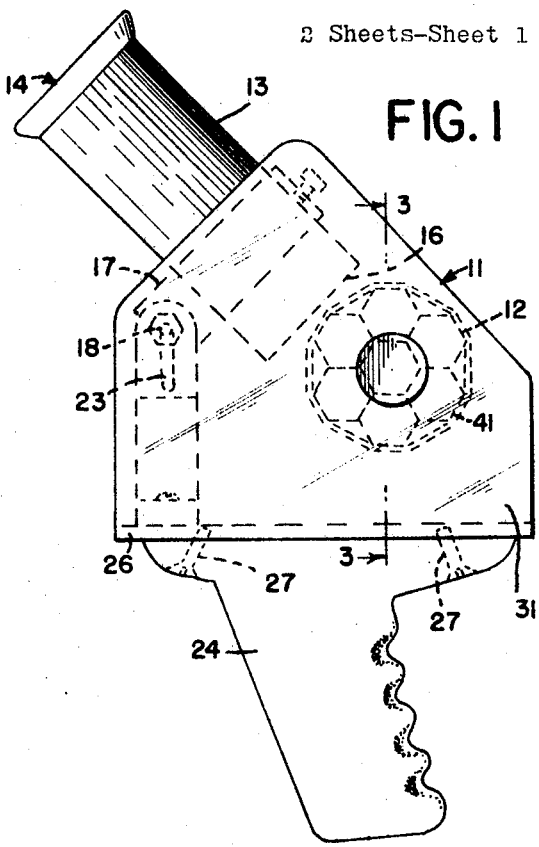
FIG. 1
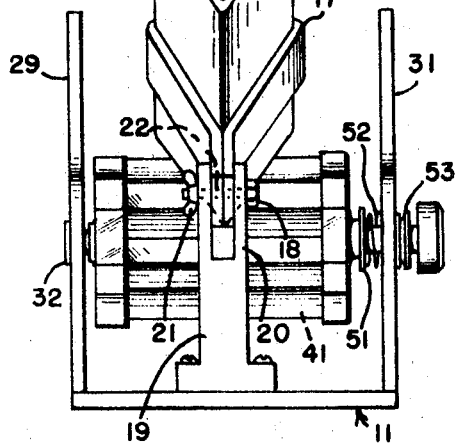
FIG. 2
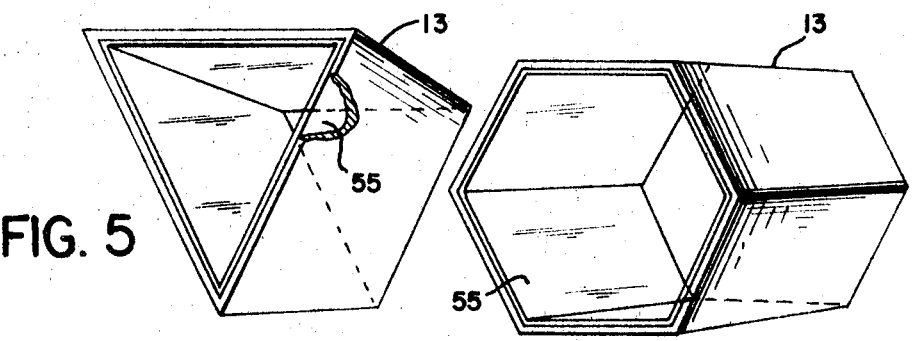
FIG. 5
FIG. 6
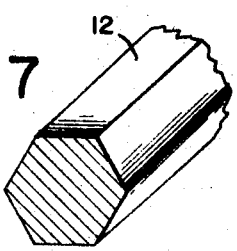
FIG. 7
INVENTOR.
JACK TONEY
BY Harold D. Jastram
ATTORNEY May 26, 1970     J. TONEY     3,514,178

KALEIDOSCOPE

Filed July 10, 1967     2 Sheets-Sheet 2

INVENTOR.
JACK TONEY

BY Harold D. Jastram

ATTORNEY

United States Patent Office 3,514,178
Patented May 26, 1970

3,514,178
KALEIDOSCOPE
Jack Toney, Minneapolis, Minn., assignor to General
Mills, Inc., a corporation of Delaware
Filed July 10, 1967, Ser. No. 652,288
Int. Cl. G02b 27/08
U.S. Cl. 350—4                                     3 Claims

ABSTRACT OF THE DISCLOSURE

A kaleidoscope having a viewing tube coated with a light reflecting material and a rotatable display. The display is a generally cylindrical object having multicolored portions or printed matter on the viewed part of the display. The display is easily changeable so that it can act as a teaching aid for colors, words, letters and the like.

BACKGROUND OF INVENTION

The kaleidoscopes currently manufactured hold the interest of a viewer for a very short time even though the pattern and color variation may be virtually infinite in number. The reason for this is that there is a monotonous overall effect and lack of variation which fails to hold the interest of the viewer for any substantial length of time. Further, the kaliedoscopes currently manufactured have very limited application because of the uncontrolled nature of the image which is being viewed. Typically, a kaleidoscope presents a rather limited potential for use in the educational field primarily because previously manufactured kaleidoscopes are merely toys designed for entertainment. The characteristic unpredictability of the image of the usual kaleidoscope prevents the kaleidoscope from being an effective teaching aid.

It is therefore an object of the present invention to provide a new and improved kaleidoscope which has an easily changeable display and which can be used for educational purposes.

It is a further object of the present invention to provide a new and improved kaleidoscope which has an easily changeable image display using ambient light and which has predictable images useful for educational purposes.

It is a further object of the present invention to provide a new and improved kaleidoscope which permits the viewer to obtain a stereoscopic image from a display.

SUMMARY

A kaleidoscope according to the present invention is an observation tube mounted to observe a display which can be replaced by other displays having differing colors, pictures, or other images. The display is adapted to rotate before the observation tube so that a single display may carry, for example, a number of pure colors each of which may be observed sequentially by an observer. The individual displays are mounted on a frame so that the display may be rotated at the will of the observer. The rotating mechanism mounted in the frame of the kaleidoscope is quickly detachable and cooperates with the display so that displays having different images and lighted by ambient light may be quickly inserted in front of the observation tube of the kaleidoscope. This permits a variation in the images observed thus providing a useful educational tool for teaching young children the differences in colors or for teaching them the alphabet or for passing on similar information.

BRIEF DESCRIPTION OF THE DRAWINGS

FIG. 1 is a front view of a kaleidoscope according to the present invention,

FIG. 2 is a left side view of the kaleidoscope shown in FIG. 1, absent the handle, FIG. 5 is an isometric view of an observation tube used in the kaleidoscope of FIG. 1, FIG. 6 is an alternate configuration of a cross section of an observation tube, FIG. 7 is a fractional isometric view of a segment of the display illustrated in FIGS. 1 and 3.

DESCRIPTION OF THE PREFERRED EMBODIMENTS

Figure 3:
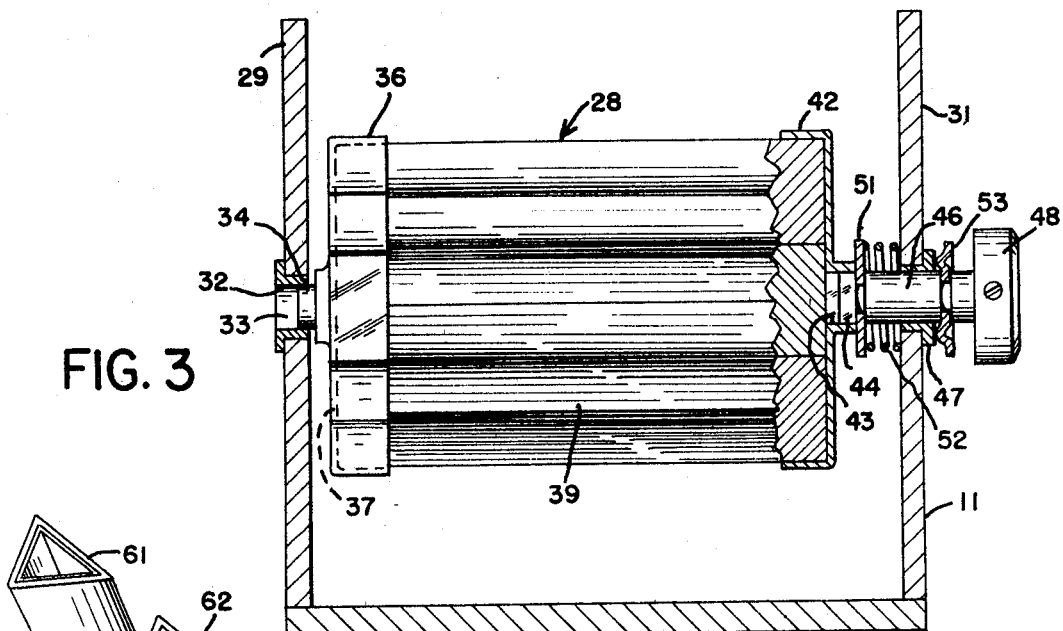
FIG. 3 is a fractional partial cross sectional view taken along line 3—3 of FIG. 1.

Referring first to FIG. 1 of the drawings, a frame 11 is provided to hold a visual display 12 in front of an observation tube 13 of the kaleidoscope. The observation tube 13 has a sight aperture 14 for an observer. This sight aperture may be large as illustrated in FIG. 2 of the drawings or it may be substantially smaller. The observation tube 13 has an objective opening 16 through which an image from the display 12 is observed by an observer looking through the sight aperture 14. Preferably ambient light (normal room lighting) is used to illuminate the display. Additional light sources may be used if desired.

The observation tube 13 is mounted in a holder 17 which is rotatably connected by bolt 18 to an upright member 19 (see FIGS. 1 and 2). This upright member 19 in turn is rigidly connected to the frame 11 of the kaleidoscope. A wing nut 21 is provided for the bolt 18 so that tension on the extension 22 of the holder 17 may be easily relaxed or increased thus permitting adjustment of the observation tube. The position of the tube 13 may be changed to a somewhat different angle by merely raising and lowering the kaleidoscope observation tube 13 and holder 17 along the length of slot 23 and by rotating the tube 13 and holder 17 angularly about the bolt 18. The tube is fixed in place by tightening wing nut 21 to increase the pressure on ears 20 to thereby lock the extension 22 in place.

The kaleidoscope may be mounted on a desk or table by simply attaching frame 11 to the table or the like. Likewise, a handle 24 may be attached to the frame 11 as illustrated in FIG. 1 to provide a portable kaleidoscope.

Either method of mounting might be used in an educational environment. The handle 24 is attached to the bottom 26 of the frame 11 by bolts 27.

Figure 4:
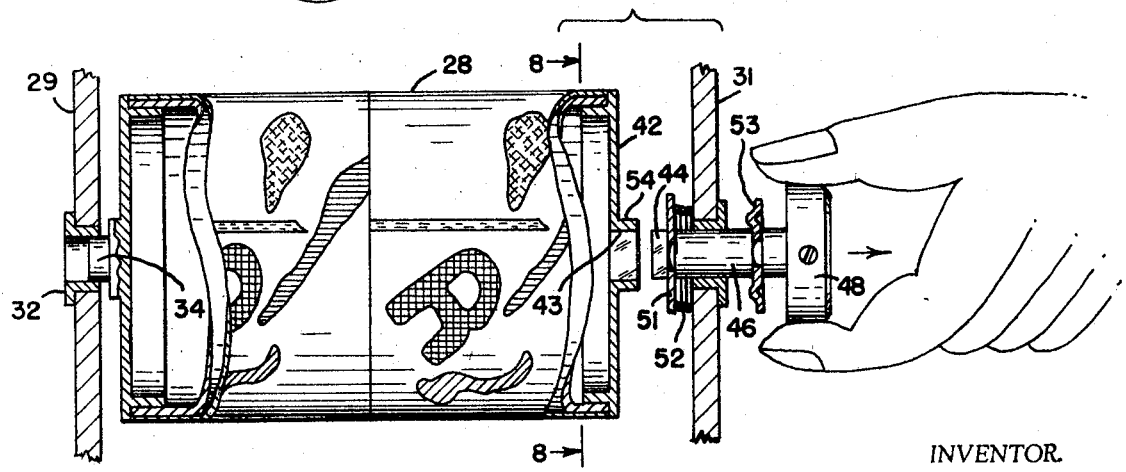
FIG. 4 is a fractional cross sectional view of a display illustrated in FIG. 3 in a partially exploded view showing a different display being inserted into a frame.

The image display which is used in the present kaleidoscope is best illustrated in FIGS. 3 and 4. In FIG. 3 it will be observed that the display 28 is mounted in frame 11 between sidewalls 29 and 31 respectively. A sleeve 32 is placed in sidewall 29 and contains a circular opening 33 designed to accept shaft 34 thereby forming a friction bearing so that the display 28 may be rotated about its axes. In a preferred emobdiment, a shaft 34 is attached to the display 28 by a cap 36 which closes the end 37 of the display 28 to hold the image carrying portion 39 of the display 28 in position.

Figure 8:
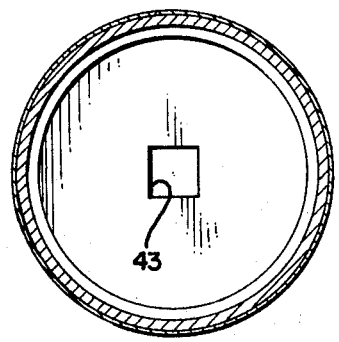
FIG. 8 is a cross sectional view taken along line 8—8 of FIG. 4.

As illustrated in FIG. 1 of the drawings, the display 28 of a preferred embodiment may be formed from a number of hexagonal rods which are positioned side by side and fitted into end cap 36 to form a generally cylindrical display 28. The other end of the rods 41 are fitted into another end cap 42 at the other end thereof so that the display piece 28 may be rotated in front of the objective opening 16 of the observation tube 13. Rods 41, for example, might each be of a different color. For instance, the rods may be colored so that they include the primary colors together with secondary colors for teaching young children the primary and secondary colors. Cap 42 is slightly different from cap 36 and contains an aperture 43, see FIG. 8 and FIG. 4 of the drawings, which is designed to engage end portion 44 of shaft 46. Shaft 46 is rotatably mounted in a sleeve 47 which in turn is mounted in wall 31 of the frame 11 on the same axes as shaft sleeve 33. End portion 44 of the shaft 46 may be square so that the square portion will serve as means for rotating the display 28. A handle or knob 48 is rigidly connected to shaft 46 so that an observer or an assistant may rotate the display 28 by simply rotating knob 42. This in turn rotates shaft 46 and the display 28. An alternate embodiment of this might include a crank of some type for rotating the display 28.

The shaft 46 also has incorporated therein an easy detachment feature which incorporates a flange or clip spring 51, a compression coil spring 52 and a clip spring 53 illustrated in both FIGS. 3 and 4. As will be observed in FIG. 4, the display 28 is placed between the walls 29 and 31 of the frame 11 and the end portion 44 of the shaft 46 is pressed against a flange 51. The flange 51 is used to retain a coil spring positioned between sleeve 47 and the flange 51 to bias the shaft laterally so that the shaft 46 extends as far to the left in FIG. 4 as the clip spring 53 will permit. Clip spring 53 engages the sleeve 47 to terminate lateral movement of the shaft 46 caused by the compression coil spring 52.

When the display 28 is placed in the kaleidoscope, the operator merely inserts the end portion 47 of the shaft 46 into the aperture 43 of cap 42 to engage the flange 51. The flange 54 thereby compressing coil spring 52. (The operator may also pull knob to compress spring 52.) This permits the operator to insert shaft 34 into sleeve 32 for rotation. The operator then releases the display piece 28 (or knob 48) and the compression coil spring 52 then forces the display piece 28 laterally to the left as viewed in FIG. 4, so that the shaft 34 is securely inserted within the sleeve 32 and portion 44 enters aperture 43. When this is completed, the display piece 28 is ready for rotation by the knob 48.

It may be observed that this coil spring and rotation feature permits the use of a number of displays 28 with a multitude of teaching aids depicted on the outer surface to be used in a single kaleidoscope in order to teach youngsters many simple facts such as color, the letters of an alphabet or the like. Thus, the monotony of the display piece associated with most kaleidoscopes and the lack of control of the image of prior kaleidoscopes is overcome by the use of a number of display pieces easily placed before the observation tube 13.

Light reflections of ambient light may be used as a means for providing satisfactory and striking images. In order to provide such a striking image in, for example, the case where the primary and secondary colors are illustrated by the use of rods, the interior of the observation tube 13 is coated with a reflective material. This reflection material may merely be a plastic coating such as nylon, Teflon or the like or the coating may be a metallic coating such as application of aluminum foil 55 to the interior surface of the tube 13 as illustrated in FIG. 5. This reflective surface may be of any length and may extend from the objective opening to the sight aperture if desired. By using this reflective coating, the colors observed by one looking through the observation tube 13 is enhanced and made more interesting. Likewise, the image observed may be enhanced in attractiveness by providing the kaleidoscope with a noncircular observation tube 13. Illustrations of alternate choices for tube configuration are illustrated in FIGS. 5 and 6 of the drawings which disclose triangular and hexagonal shapes respectively. These shapes provide interreflection which alters the image observed.

Figure 9:
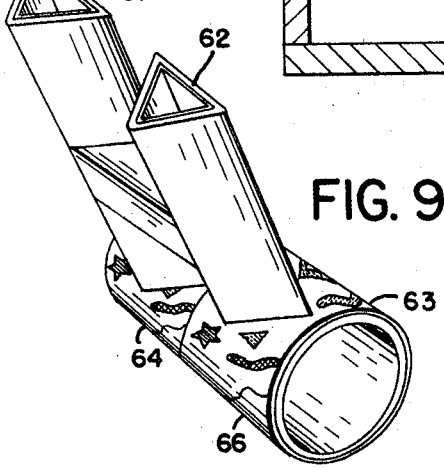
FIG. 9 is an isometric view of an alternate embodiment of the kaleidoscope illustrated in FIG. 1 utilizing two observation tubes.

An alternate embodiment of the kaleidoscope disclosed herein is illustrated in FIG. 9 of the drawings which shows the use of two observation tubes 61 and 62 which are mounted side by side to provide the viewer with a stereoscopic view of an image on a display 63. The display 63 in this situation may be simply a color display as illustrated in the previous figures in which the same color will be observed through each of the observation tubes 61 and 62. The display 63 may contain dual images 64 and 66 which are identical thereby providing a somewhat more stereoscopic image to the viewer. As with the previously described kaleidoscope having one observation tube, this stereo kaleidoscope may be provided with more than one image by simply placing a multitude of double images about the circumference of display 63 thereby providing the observer with a variety of different subjects which may be sequentially brought into observation by simply rotating a knob 48 which is used in this kaleidoscope.

It is to be understood that the above embodiments and specific samples are merely illustrative of the principles of the invention and are not to be construed as limitations thereof. For example the hexagonal rods 12 may have a multicolored pattern on the surfaces which are observed by a party viewing the display through the observation tube 13.

Now, therefore I claim:

1. A keleidoscope which comprises a frame, an observation tube having an optical axis mounted on said frame and having a sighting aperture and an objective opening on said axis; said tube having an interior light reflective coating extending at a portion of the length of said tube from said objective opening; an elongated, generally cylindrical rotatable color display having a central axis mounted adjacent said objective opening and with the central axis perpendicular to said optical axis, said display is formed from hexagonally shaped rods of a different color and each mounted to contact an adjacent rod to form a generally cylindrical shape, a first end cap mounted on a first end of said display, said first cap having a shaft mounted coaxial to the central axis of the cap and display, a first sleeve means mounted in said frame for receiving said shaft for rotation in the sleeve, a second sleeve mounted in said frame on the same axis as said first sleeve, a second end cap mounted on a second end of said display; said first and second caps secure the ends of the rods to hold the hexagonal rods permanently in contact with each other, and rotation means mounted in said second sleeve for engaging said second end cap of said display for rotating said display.

2. A kaleidoscope in accordance with claim 1 in which the said rotation means includes a shaft adapted to rotate within said second sleeve and having a display engaging portion at one end which engages said second cap, a flange means on said shaft positioned between said engaging portion and said second sleeve, a coil spring between said flange means and said sleeve and a clip spring on said shaft engaging said sleeve beyond opposite said spring to prevent said coil spring from moving said shaft laterally out of said second sleeve.

3. A kaleidoscope in accordance with claim 1 in which said observation tube has two parallel sight channels each of said sight channels having a sighting aperture and an objective opening and in which said rotatable color display has identical color images which are simultaneously positioned adjacent the respective objective openings.

References Cited
UNITED STATES PATENTS

| | | | |
|---|---|---|---|
| 1,078,008 | 11/1913 | Stough | 350—5 |
| 1,712,431 | 5/1929 | Hadley. | |
| 2,697,380 | 12/1954 | Wyser. | |
| 2,764,057 | 9/1956 | Oller | 350—4 |

JULIA E. COINER, Primary Examiner

U.S. Cl. X.R.

350—5